(12) United States Patent
Boyra Eizaguirre (10) Patent No.: US 9,739,264 B2
(45) Date of Patent: Aug. 22, 2017

(54) METHOD OF OPERATING A WIND TURBINE

(71) Applicant: Alstom Renovables España, S.L., Barcelona (ES)

(72) Inventor: Jon Boyra Eizaguirre, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 619 days.

(21) Appl. No.: 14/355,204

(22) PCT Filed: Nov. 16, 2012

(86) PCT No.: PCT/EP2012/072839
§ 371 (c)(1),
(2) Date: Apr. 29, 2014

(87) PCT Pub. No.: WO2013/072461
PCT Pub. Date: May 23, 2013

(65) Prior Publication Data
US 2014/0308126 A1 Oct. 16, 2014

Related U.S. Application Data

(60) Provisional application No. 61/587,314, filed on Jan. 17, 2012, provisional application No. 61/656,413, filed on Jun. 6, 2012.

(30) Foreign Application Priority Data

Nov. 17, 2011 (EP) ..................... 11382350

(51) Int. Cl.
*F03D 7/02* (2006.01)

(52) U.S. Cl.
CPC ......... *F03D 7/0224* (2013.01); *F03D 7/0276* (2013.01); *F03D 7/0292* (2013.01);
(Continued)

(58) Field of Classification Search
CPC ... Y02E 10/723; Y02E 10/725; Y02E 10/721; H02P 2009/004; F03D 7/0224
(Continued)

(56) References Cited

U.S. PATENT DOCUMENTS 6,809,431 B1 10/2004 Schippmann
6,840,734 B2 * 1/2005 Hansen ................. F03D 7/0224
415/1

(Continued)

FOREIGN PATENT DOCUMENTS

CA 2794856 10/2011
DE 19844258 3/2000
DE 10 2010 014165 10/2011

OTHER PUBLICATIONS

International Search Report for PCT/EP2012/072839, mailed May 23, 2013, 11 pgs.

*Primary Examiner* — Tulsidas C Patel
*Assistant Examiner* — Charles Reid, Jr.
(74) *Attorney, Agent, or Firm* — Dority & Manning, P.A.

(57) ABSTRACT

Method of operating a wind turbine in response to a wind speed, the wind turbine having at least a rotor with a plurality of blades and a generator comprising a generator rotor and a generator stator, the method comprising, at wind speeds above a first wind speed, increasing the pitch angle of the blades and reducing the rotor speed with increasing wind speed, said first wind speed being superior to the nominal wind speed; wherein at a second wind speed, the speed of the generator rotor is equal to the synchronous generator rotor speed, said second wind speed being superior to said first wind speed; and wherein at wind speeds superior to said second wind speed, the speed of the generator rotor is lower than the synchronous generator rotor speed.

4 Claims, 7 Drawing Sheets

(52) U.S. Cl.
CPC . *F05B 2220/70646* (2013.01); *F05B 2260/71* (2013.01); *F05B 2270/101* (2013.01); *F05B 2270/32* (2013.01); *F05B 2270/3201* (2013.01); *F05B 2270/327* (2013.01); *F05B 2270/335* (2013.01); *Y02E 10/723* (2013.01); *Y02E 10/725* (2013.01)

(58) Field of Classification Search
USPC .......................................... 416/1; 290/44, 55
See application file for complete search history.

(56) References Cited

U.S. PATENT DOCUMENTS

| | | | |
|---|---|---|---|
| 7,351,033 B2* | 4/2008 | McNerney | F03D 7/0224 416/1 |
| 2003/0185665 A1* | 10/2003 | Hansen | F03D 7/0224 415/1 |
| 2009/0008938 A1 | 1/2009 | Erdman et al. | |
| 2010/0038909 A1 | 2/2010 | Andersen | |
| 2010/0140938 A1* | 6/2010 | Cook | F03D 7/043 290/44 |
| 2011/0142594 A1* | 6/2011 | Dinjus | F03D 7/0224 415/4.3 |
| 2011/0142634 A1* | 6/2011 | Menke | F03D 7/0224 416/46 |
| 2011/0211951 A1* | 9/2011 | Kooijman | F03D 7/0224 416/1 |
| 2012/0061962 A1* | 3/2012 | Nagasaki | F03D 7/0224 290/44 |

* cited by examiner

METHOD OF OPERATING A WIND TURBINE

This application claims the benefit of European Patent Application EP 11382350.4 filed on 17 Nov. 2011 and U.S. Provisional Patent Application Ser. No 61/587,314 filed on 17 Jan. 2012 and U.S. Provisional Patent Application Ser. No. 61/656,413 filed on 6 Jun. 2012, which are herein incorporated in their entirety by reference thereto.

The present invention relates to a method of operating a wind turbine. More particularly, it relates to a method of operating a wind turbine above nominal wind speed.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

An important auxiliary system generally provided on wind turbines is a pitch system. Pitch systems are employed for adapting the position of a wind turbine blade to varying wind conditions by rotating the blade along its longitudinal axis. In this respect, it is known to rotate a wind turbine blade in such a way that it generates less lift (and drag) when the wind speed increases. This way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blade towards its vane position, when a turbine is temporarily stopped or taken out of operation for e.g. maintenance.

A common control strategy of a variable speed wind turbine is to maintain the blade in a predefined "below rated pitch position" at wind speeds equal to or below nominal wind speed (for example from approximately 3 or 4 m/s to 15 m/s). Said default pitch position may generally be close to a 0° pitch angle. The exact pitch angle in "below rated" conditions depends however on the complete design of the wind turbine. In the lower wind speed regions (at "partial load"), the objective is generally to maximize power output by maintaining pitch constant, thereby catching maximum energy, and varying generator torque and the rotor speed to keep the power coefficient, $C_p$, at a maximum. Above the nominal speed (for example from approximately 10 m/s to 25 m/s), the blades are rotated to maintain the aerodynamic torque delivered by the rotor substantially constant. Cut-in wind speed may e.g be around 3 m/s, nominal wind speed may be e.g. around 10 m/s and cut-out wind speed may e.g. be around 25 m/s. The nominal wind speed, cut-in wind speed and cut-out wind speed may of course vary depending on the wind turbine design. Said wind speeds may be measured typically at hub height.

Often, a doubly fed induction generator (DFIG) is used on variable speed wind turbines. In these DFIG's, the generator rotor is connected to the grid through a power electronics converter. Such a converter may comprise a Grid-Side-Converter (GSC), a DC link, and a Machine-Side-Converter (MSC). An advantage of using a DFIG with converter in wind turbines is that reactive power can be exported and imported from the converter. Also, through the control over rotor currents and voltages, synchronization with the grid is possible even though the rotor speed varies. Furthermore, a DFIG allows reducing the capacity and dimensions of the converters used.

It is a general goal to try to maximize electricity generation from cut-in wind speed to cut-out wind speed. However, in certain wind turbines with particularly large blades, when the wind speeds reaches a predetermined value above nominal wind speed, the loads on the blades may need to be reduced in order to ensure structural integrity of the wind turbine. Alternatively, the whole of the wind turbine needs to be structurally reinforced to such a point that the Cost-of-Energy (COE) would increase.

One reason for employing relatively large blades may be the limited number of suitable sites for wind turbines. It has become practice in the last couple of years to design and manufacture new wind turbine models which are based on older models, but in which new longer blades are used. In these cases, it may be that only the blades are substituted whereas the other components or many other components of the wind turbine stay the same. This may be useful particularly for generating more electricity at predominant wind speeds. However, at relatively high wind speeds, this kind of configuration could cause structural problems due to high loads. Therefore, the operational range of the wind turbine may be adjusted, i.e. reducing the cut-out wind speed, or the rotor speed of the wind turbine may be reduced at high wind speeds.

In practice, wind turbine designers and manufacturers need to balance the COE, the operational range of the wind turbines and the power that can be generated. The present invention aims at providing a method of operating a wind turbine that improves the balance, e.g. a method that allows increasing the operation range and/or the power generated without substantially increasing the COE.

SUMMARY

According to a first aspect, a method of operating a wind turbine in response to a wind speed is provided, wherein the wind turbine has at least a rotor with a plurality of blades and a generator comprising a generator rotor and a generator stator. In accordance with a first aspect, the method comprises increasing the pitch angle of the blades and reduce the rotor speed with increasing wind speed at wind speeds above a first wind speed, said first wind speed being superior to the nominal wind speed. The speed of the rotor is reduced to such an extent that at a second wind speed (superior to said first wind speed), the generator rotor speed is equal to the synchronous generator rotor speed. The method further comprises that at wind speeds superior to said second wind speed, the speed of the generator rotor is lower than the synchronous generator rotor speed.

Implementations according to the first aspect allow a wind turbine design with relatively large blades for increasing energy capture at dominant relatively low wind speeds, while at the same time enabling a large operational range for the wind turbine, i.e. having a conventional cut-out wind speed and further without the necessity to increase the strength and weight of wind turbine components.

Optionally, the generator may be a Doubly Fed Induction Generator (DFIG) and a method of operating a wind turbine further comprises, at wind speeds between said first wind speed and said second wind speed, reducing the generator torque at least at or close to the second wind speed. Additionally, the generator torque may be increased at wind speeds superior to said second wind speed, or the generator torque may be maintained at a reduced level at wind speeds superior to said second wind speed.

When reducing the speed to such an extent that the generator rotor speed decreases to or beyond the synchronous generator rotor speed, and depending on the converters used, a problem may arise in the Machine-Side-Converter (MSC). At synchronous generator rotor speed, DC current may flow through the MSC and the MSC may not be able to endure this situation for very long. One option to avoid this problem is by reducing the generator torque around the operational point corresponding to synchronous speed of the generator rotor. At reduced torque, the MSC will be able to endure the situation for a longer time. And if the torque is below a critical value, the MSC may be able to operate "indefinitely" at this point of operation without problems.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
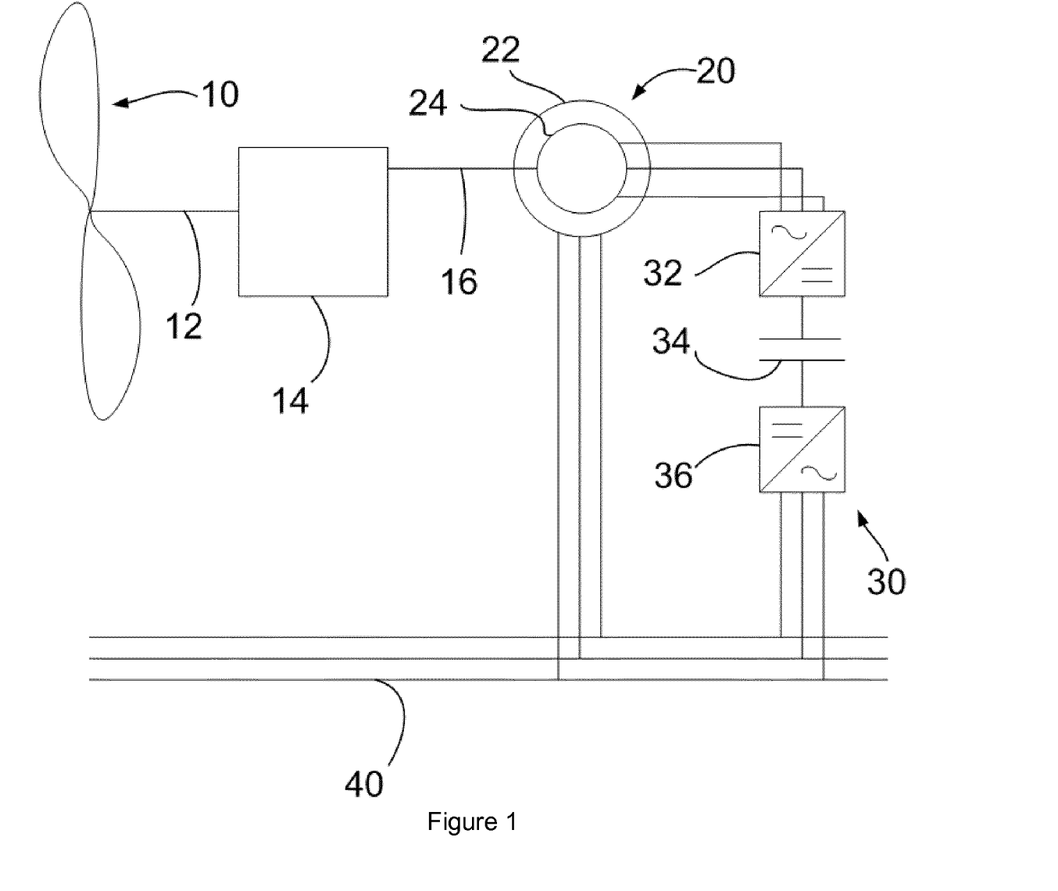
FIG. 1 illustrates a wind turbine comprising a doubly-fed induction generator.

In FIG. 1, a schematic representation of a wind turbine comprising a rotor 10 having a plurality of blades is shown. The wind sets the rotor 10 into rotation, such that the low speed shaft (rotor shaft) 12 starts rotating. A gearbox 14 may convert the relatively slow rotation of the rotor shaft 12 into a fast rotation of the high speed shaft 16. This high speed shaft 16 may be operatively connected with the generator rotor 24.

The generator 20 further comprises a stator 22. As illustrated, the generator stator may be directly connected to electricity grid 40. Generally, such an electricity grid may have three electric phases as illustrated in FIG. 1. The generator rotor 24 is also connected to grid 40 through a back-to-back frequency converter 30. The frequency converter 30 may comprise a machine side converter 32 and a grid side converter 36 converting AC current to DC current and vice versa. The frequency converter 30 may further comprise a DC link 34. Through the back-to-back converter, the generator torque may be regulated. In addition to the pitch control system which regulates the angle of attack of the blades of rotor 10, a further operational control is thus provided, specifically for variable speed operation.

Figure 2A:
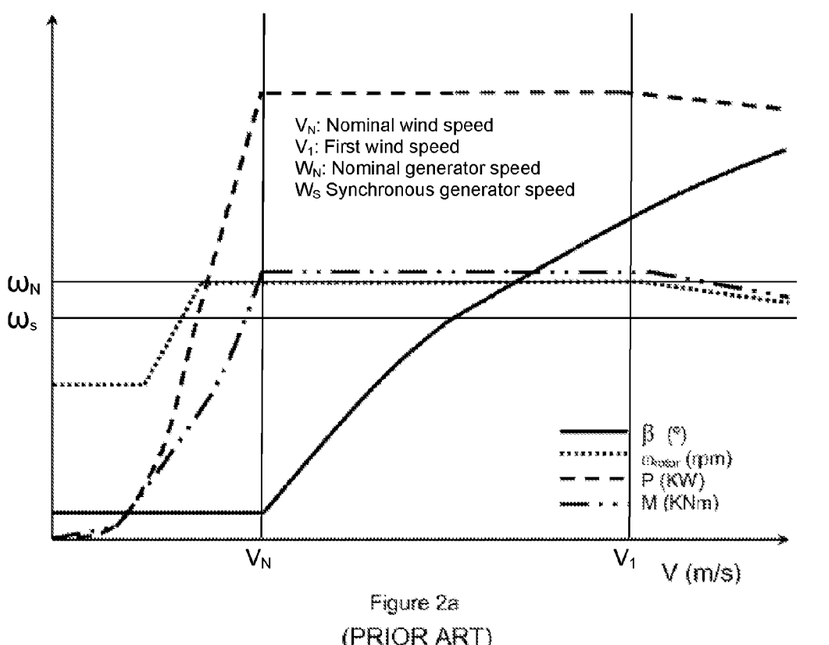
FIGS. 2a and 2b illustrate a prior art method of operating a wind turbine.

FIG. 2a illustrates a prior art control method and shows respectively the pitch angle (β), rotor speed ($\omega_{rotor}$), to electrical power (P) and aerodynamic torque (M) at varying wind speeds.

As previously described, the pitch angle is generally not changed until nominal wind speed is reached, e.g. at 11 m/s. At a slightly lower wind speed, e.g. around 8.5 m/s, nominal rotor speed may be reached. At wind speeds above nominal wind speed, the pitch angle may be varied such as to maintain the aerodynamic torque substantially constant. The rotor speed, generator torque and electrical power generated may also be maintained substantially constant. This may be maintained from nominal wind speed to cut-out wind speed. Alternatively, and such as is shown in FIG. 2a, close to cut-out wind speed, e.g. in the range 22 m/s-25 m/s, both rotor speed and torque may be slightly reduced.

Figure 2B:
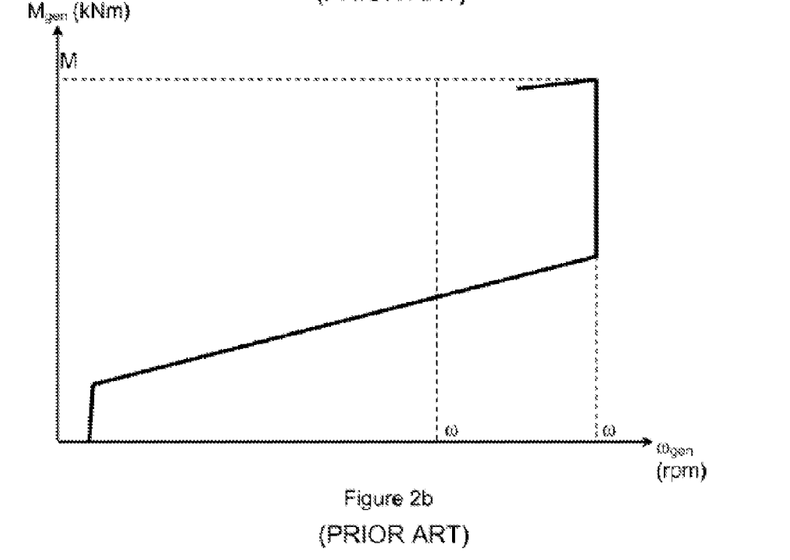

FIG. 2b illustrates the generator torque ($M_{gen}$) versus the generator speed $\omega_{gen}$ corresponding substantially to the wind turbine operation shown in FIG. 2a. With increasing wind speed (below nominal wind speed), the speed of rotation of the generator rotor increases until nominal rotor speed is reached. At the same time, the generator torque is gradually increased. At wind speeds above a wind speed corresponding to a nominal rotor speed, but below the nominal wind speed (i.e. using the same numbers as before, between 8.5 m/s and 11 m/s), the pitch angle of the blades may be kept the same, and control is carried out by increasing the generator torque. Once nominal wind speed is reached, the pitch of the blades is changed such as to keep the speed of rotation constant at the nominal rotor speed. This corresponds to a speed of rotation of $\omega_N$, the nominal generator rotor speed.

At the very top right corner of the diagram, at nominal rotor speed, and maximum torque, nominal power is produced by the wind turbine generator.

Optionally, in accordance with FIG. 2a, at wind speeds close to the cut-out wind speed, pitch and/or torque may be controlled in such a way as to slightly reduce the rotor speed and, consequently, the generator rotor speed. As a result, structural loads, and generated power are also reduced in this region.

Figure 3A:
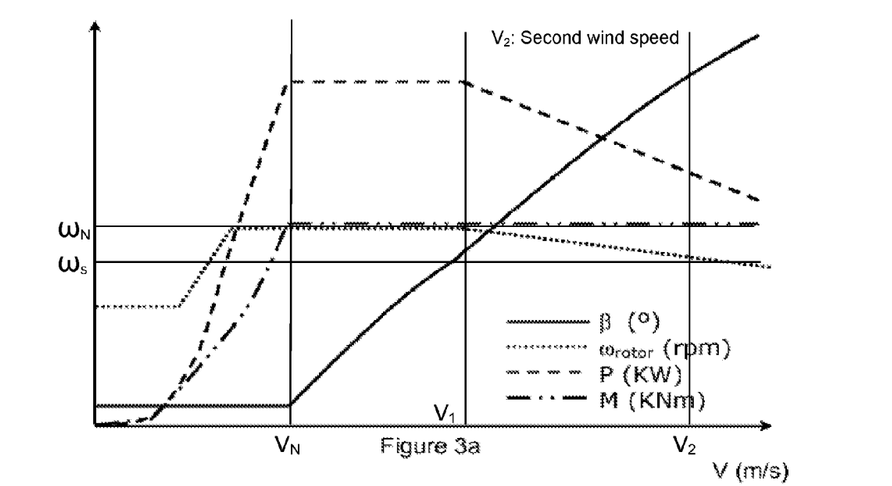
FIGS. 3a-3c illustrate a potential problem related to a method of operating a wind turbine in accordance with embodiments of the present invention.
Figure 3B:
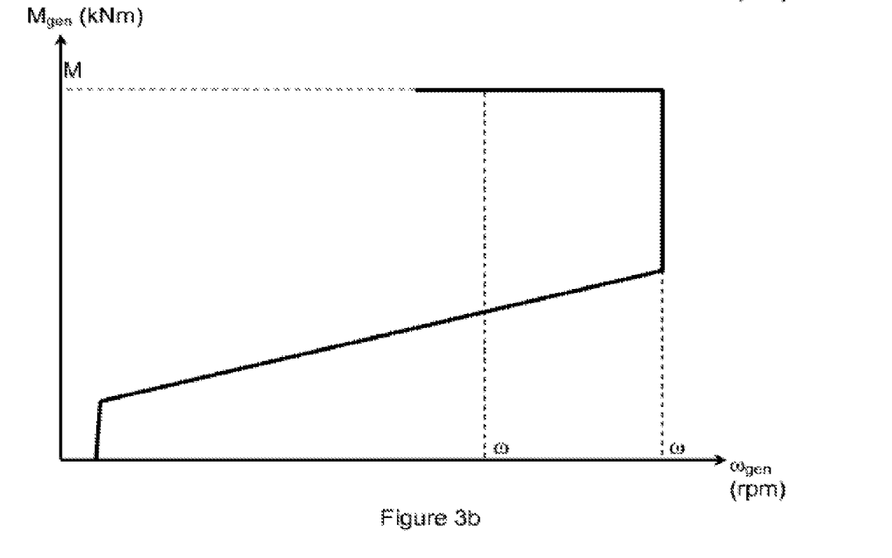
Figure 3C:
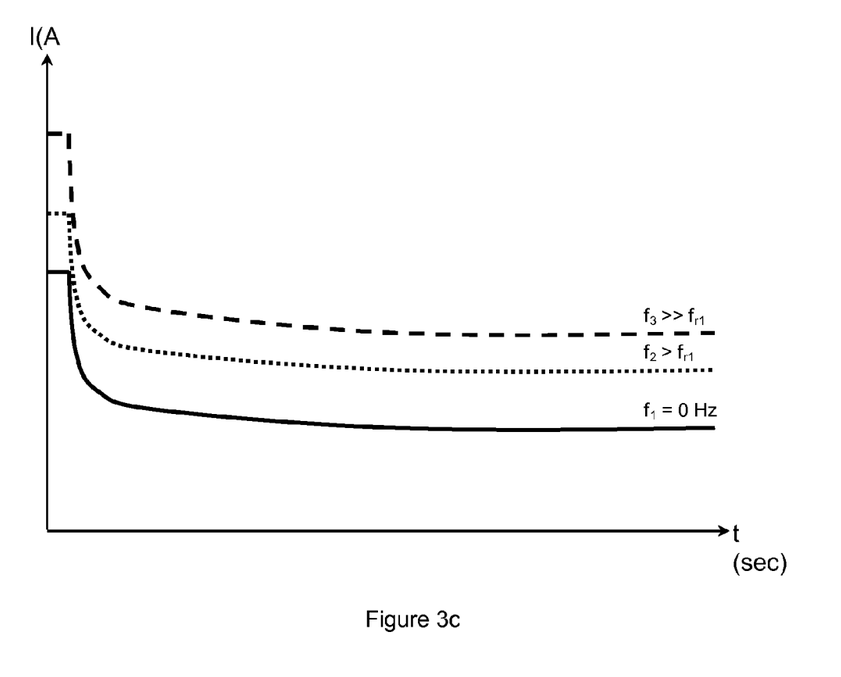

FIGS. 3a - 3c illustrate a method of operating a wind turbine in accordance with embodiments of the present invention and a potential problem that may arise. FIG. 3a illustrates a control method and shows, similarly to what was shown in FIG. 2a, respectively the pitch angle (β), rotor speed ($\omega_{rotor}$), electrical power (P) and aerodynamic torque (M) at varying wind speeds.

A first notable difference between this implementation and the prior art control method is that above nominal wind speed, e.g. from approximately 16 m/s the pitch angle of the blades is changed to a further extent than in the previous example, and the rotor speed is reduced at a substantially lower wind speed than in the prior art method of FIG. 2a. Furthermore, whereas in FIG. 2a, the electrical power generated may be kept at a maximum value for a large share of the operational range, this may not be the case with this method of operation. In the method of FIG. 3a, the loads may be reduced to a further extent than in the prior art method.

With increasing wind speed, the generator rotor speed may be further reduced, beyond the point of synchronous speed of the generator rotor, see also FIG. 3b. Synchronous speed, $\omega_s$, refers to the speed at which the frequency of the magnetic field of the generator rotor corresponds to the frequency of the magnetic field of the stator (corresponding to the frequency of the grid, e.g. 50 Hz or 60 Hz). At 60 Hz, synchronous generator rotor speed may be 1800 rpm for a generator comprising two pole pairs. For a 50 Hz grid, with the same generator the synchronous generator rotor speed may be 1500 rpm.

At this point, DC current is produced instead of AC current at the Machine-Side-Converter (MSC). FIG. 3c illustrates the maximum load capabilities of a typical Machine-Side-Converter (MSC). On one axis, the magnitude of currents is shown and on the other axis, the time the MSC can endure such currents. It may be seen that the currents the MSC can withstand during a prolonged period of time are low at f=0 Hz (which corresponds to a situation wherein the MSC is subjected to DC current). There is thus a risk that the MSC is overloaded and it may thus happen that the MSC (and the wind turbine as a whole) shuts down.

In principle, a similar situation could potentially also arise at a lower wind speed, as may be seen in the same FIG. 3b. As the wind turbine is speeding up with increasing wind speed, the generator rotor also passes by the synchronous generator rotor speed. However, at this point, the generator torque is much smaller and therefore generally does not cause any problem.

However, when synchronous generator rotor speed is reached at high wind speeds, the generator torque (and rotor currents) may be relatively high and it is possible that the wind turbine would need to operate at or close to that point for a prolonged period of time.

In order to avoid the aforementioned problem, several options are available: on the one hand, the power converter may be adapted to account for this situation. However, oversizing of the converter may lead to a higher cost. As this region of operation may not be a very common one, it may not always be a preferred choice.

Various alternative methods are available that are able to follow the method of operating a wind turbine and reduce the speed beyond the synchronous speed. Several of these methods are discussed with reference to FIGS. 4a-4f.

Figure 4A:
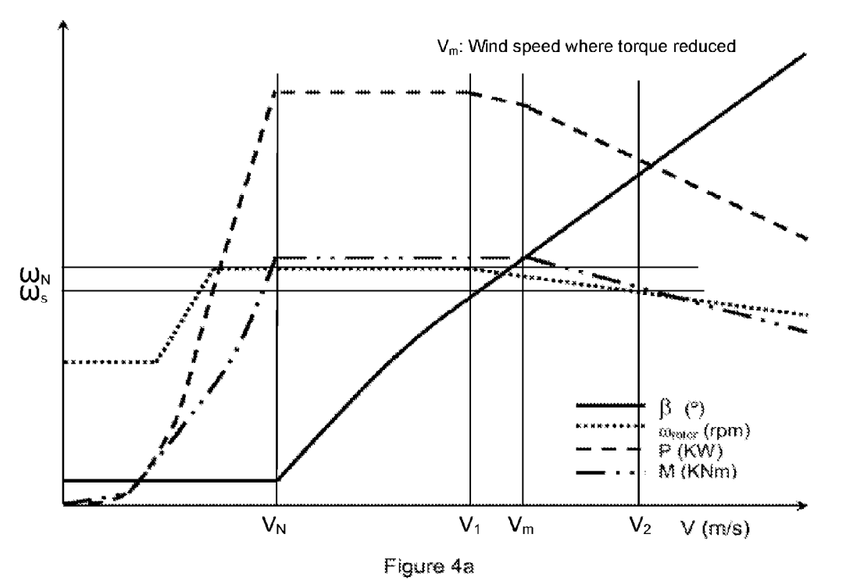
FIGS. 4a-4f illustrate further methods of operation of a wind turbine in accordance with various embodiments of the present invention.
Figure 4B:
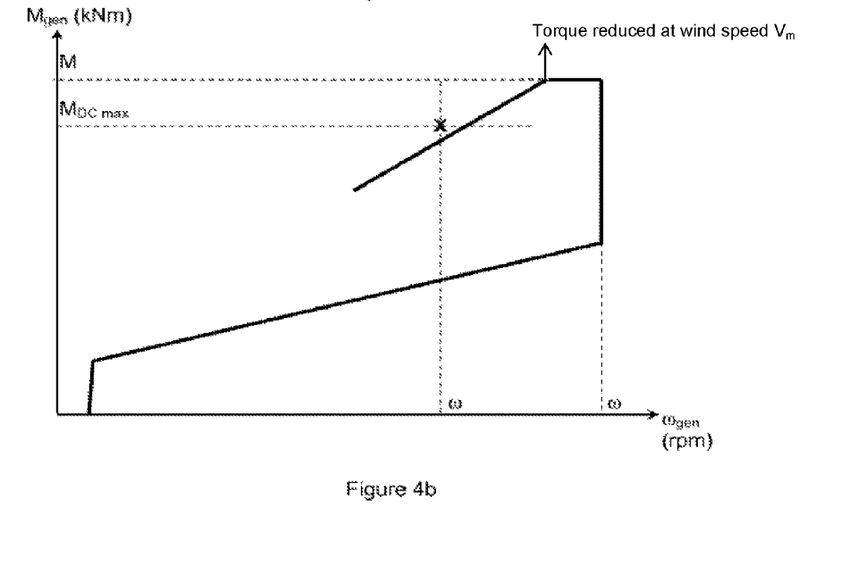

One way to avoid the aforementioned problem of overloading the MSC is illustrated in FIGS. 4a and 4b. FIG. 4a shows respectively the pitch angle ($\beta$), rotor speed ($\omega_{rotor}$), electrical power (P) and aerodynamic torque (M) at varying wind speeds, and FIG. 4b shows the generator torque ($M_{gen}$) versus the generator speed $\omega_{gen}$ corresponding substantially to the wind turbine operation shown in FIG. 4a.

From a first wind speed, the rotor speed (and inherently also the generator rotor speed) is reduced. With further increasing wind speed, the generator torque is also reduced in such a way that at a second wind speed, at which the generator rotor reaches the synchronous speed, the currents are smaller than what can be sustained by the MSC. The MSC does not need to be specifically adapted for this situation, the operation range may be maintained, and the Cost-of-Energy may be controlled. At the same time, due to the relatively large blades, more electrical power may be generated at lower wind speeds.

Figure 4C:
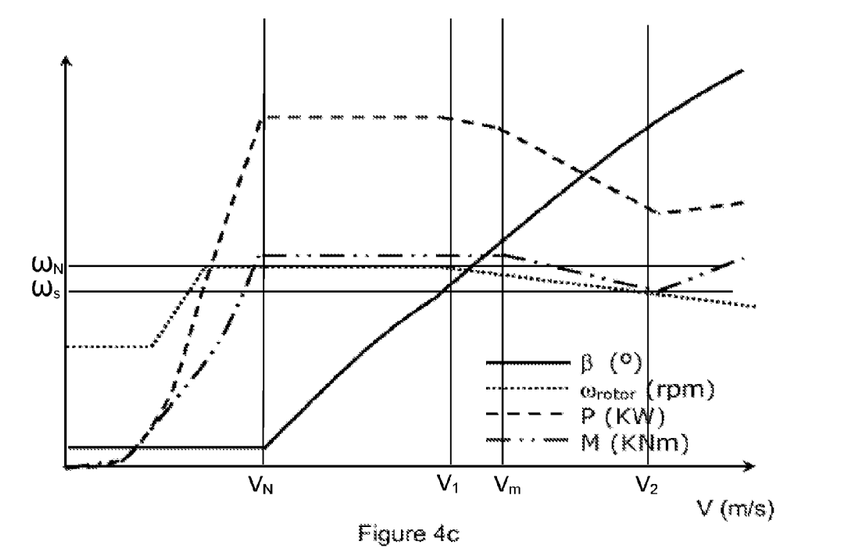
Figure 4D:
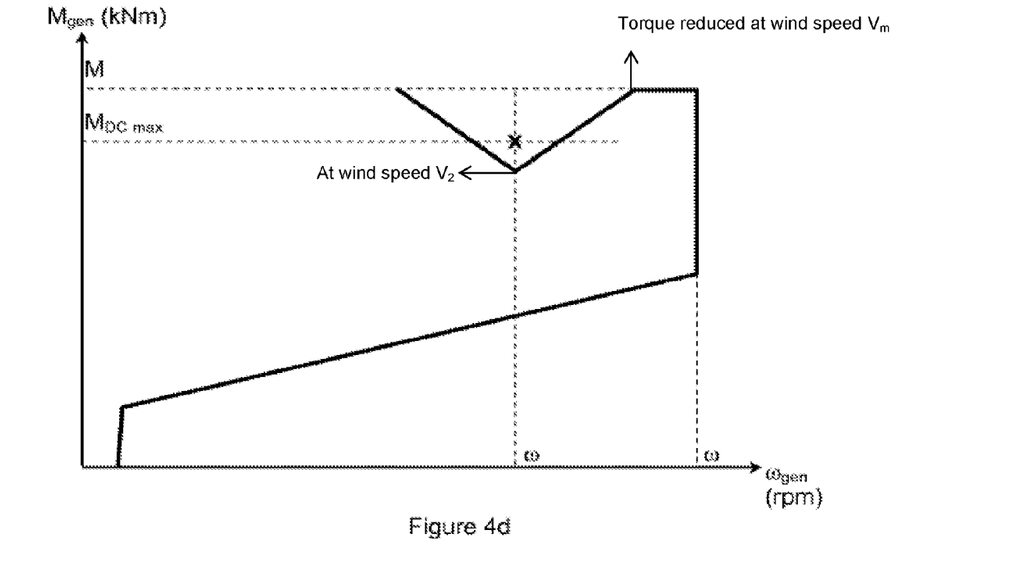

A further alternative is illustrated in FIGS. 4c and 4d. In this example, at wind speeds above said second wind speed, generator torque is increased again.

Merely in the area close to the point at which the generator rotor speed may equal synchronous speed (DC operation of the MSC), the generator torque is reduced. With increasing torque, the power generated may also be slightly increased at wind speeds superior to the second wind speed.

Figure 4E:
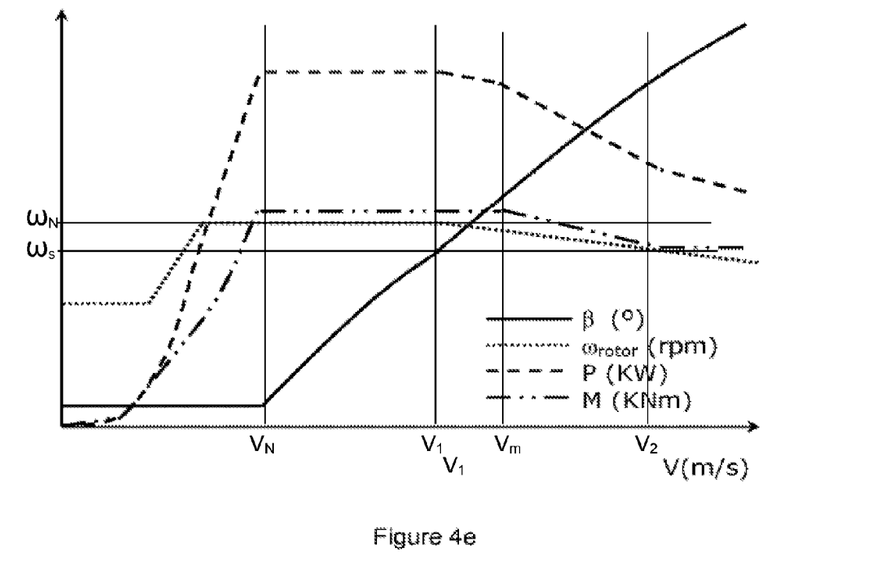
Figure 4F:
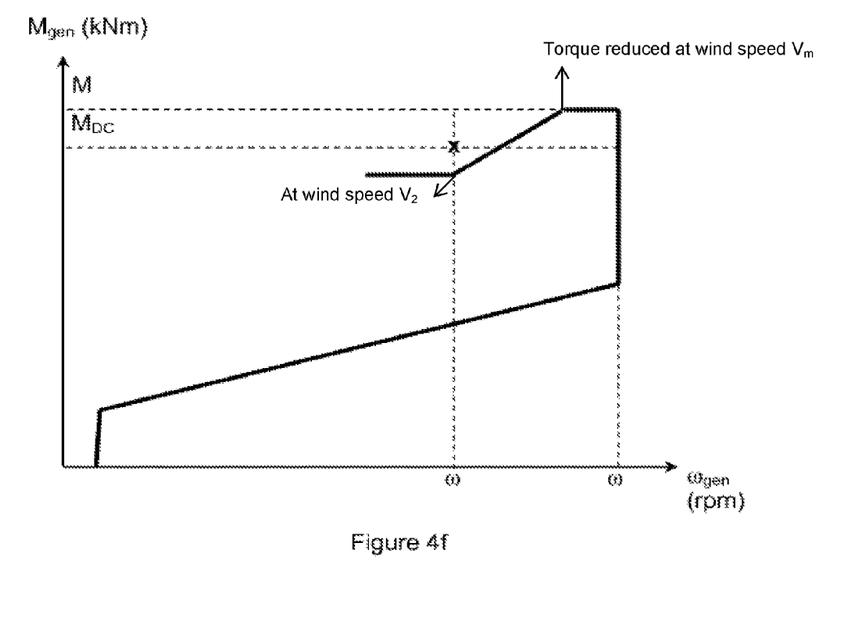

Yet a further alternative is illustrated in FIGS. 4e and 4f. In this example, at wind speeds above said second wind speed, the generator torque is maintained substantially constant. Also in this example, the generator torque is reduced in the area close to the point at which the generator rotor speed may equal synchronous speed.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a wind turbine in response to a wind speed greater than nominal wind speed, the wind turbine having at least a rotor with a plurality of blades and a generator comprising a generator rotor and a generator stator, the method comprising
   at wind speeds above a first wind speed, increasing a pitch angle of the blades so as to reduce a rotor speed with increasing wind speed, the first wind speed being greater to a nominal wind speed, wherein
   at a second wind speed, a speed of the generator rotor is equal to a synchronous generator rotor speed, the second wind speed being greater to the first wind speed, and wherein
   at wind speeds greater to the second wind speed, the speed of the generator rotor is lower than the synchronous generator rotor speed, and
   as wind speed increases beyond the first wind speed and at least to an intermediate wind speed less than the second wind speed, maintaining generator torque constant at a value of the generator torque at nominal wind speed value while reducing the speed of the generator rotor.

2. The method according to claim 1, wherein the generator is a doubly fed induction generator, the method further comprising
   at the intermediate wind speed, reducing the generator torque.

3. The method according to claim 2, wherein the generator torque is reduced up to second wind speed, and further comprising increasing the generator torque at wind speeds greater to the second wind speed.

4. The method according to claim 2, wherein the generator torque is reduced up to second wind speed, and further comprising maintaining the generator torque at a constant reduced level at wind speeds greater to the second wind speed.

* * * * *